UNITED STATES PATENT OFFICE.

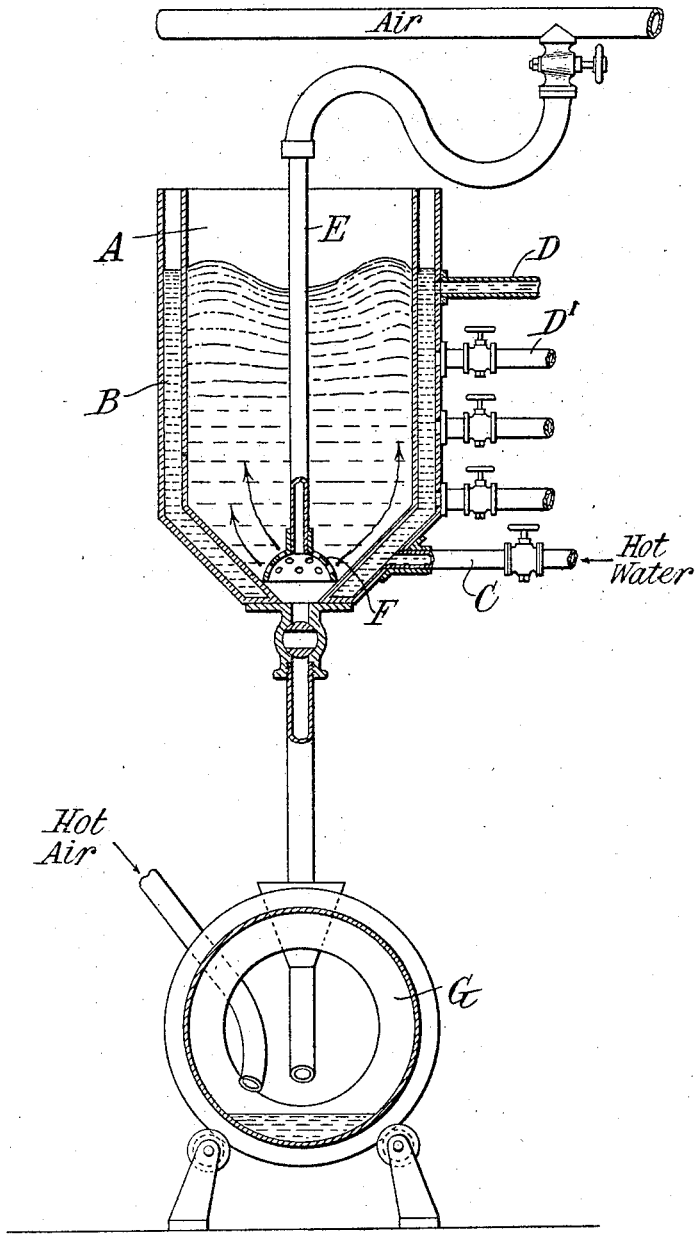

JOSEPH H. CAMPBELL, OF BROOKLYN, NEW YORK, ASSIGNOR TO NATIONAL NUTRIENT COMPANY, OF JERSEY CITY, NEW JERSEY, A CORPORATION OF NEW JERSEY.

PEPTONIZED MILK AND PROCESS OF MAKING SAME.

No. 796,496.  Specification of Letters Patent.  Patented Aug. 8, 1905.

Application filed March 29, 1902. Serial No. 100,513. (Specimens.)

*To all whom it may concern:*

Be it known that I, JOSEPH H. CAMPBELL, a citizen of the United States, residing in the borough of Brooklyn, county of Kings, city and State of New York, have invented a certain new and useful Improved Process for the Treatment of Milk and a New Food Product Resulting Therefrom, of which the following is a specification.

My invention aims to provide a process of treating milk or substances containing milk in order to produce in a new and highly-desirable form both as regards convenience and keeping qualities a food comprising either wholly or as its principal ingredient partially predigested or peptonized milk, and relates also to the new product referred to.

My invention aims also to produce a food product of the general nature described which comprises or contains partially-peptonized milk in a dry condition.

My invention aims also to produce such a product which contains an excess of the peptonizing agent in an inactive but potentially active state, but so that upon putting it in solution the activity of the peptonizing agent may be restored.

Preferably I use only the non-fatty solids of milk, since these can be more effectively reduced to a dry condition.

My improved product constitutes a highly-desirable food for infants and persons having weak digestion, since milk contains in a greater degree than any other food the elements necessary for such persons and since in my product the difficulty of digestion, which has sometimes been positively in the way of its use, is removed. The predigestion is only partial, the degree to which it is carried depending obviously upon the particular purpose of the food under preparation. In its dry and preferably powdered form it is most convenient for storage and transportation and may be eaten dry, though it is preferably dissolved in any desired quantity of water to assist the action of the peptonizing agent when taken into the stomach. It avoids the formation in the stomach of a clot or coagulum such as frequently takes place in the case of fresh milk. It may contain cream or other fatty or oily matter, added at any stage of the process. Preferably such cream or other fatty or oily matter will be added just before use. When prepared in the form of a ground and bolted product, as preferred, it has the appearance of white wheat-flour. It may be distinguished from non-digested milk by the pepsin test. Dissolving my product and applying pepsin should produce little digestive action, depending upon the degree of predigestion. Ordinary milk or dried milk dissolved and tested with pepsin shows a considerable digestive action. When treated with rennet, my improved product forms no coagulum. Ordinary milk does form a coagulum.

My improved product is valuable in acting to destroy dead matter or mucus in the stomach or intestines. The unspent portion of the peptonizing agent also assists the digestive organs in their action on the undigested portion of the food. When water is added to the dry product at ordinary temperatures, digestion automatically recommences. Thus the degree of digestion may be controlled for each quantity of the food taken by adding water and permitting the solution to stand a suitable length of time. Ordinarily the taste will determine with sufficient accuracy the degree of digestion, the taste becoming unpleasantly bitter when digestion proceeds too far. With the particular proportions of the ingredients which I have tried the product should be drunk within ten or fifteen minutes after being dissolved.

An important feature of the process is the drying of the product after peptonizing the same. The milk or substance containing milk before treatment may be in any suitable form, such as ordinary liquid milk or any available concentrated or dry milk. The process is preferably carried out with ordinary skimmed milk, so that the final product includes only the non-fatty solids of milk with a small percentage of fats, due to imperfect skimming.

Another important feature of the invention is the mixing of the peptonizing agent with milk and either at once or after a desired degree of partial digestion, rendering the peptonizing agent inactive at ordinary temperatures. I prefer on account of its various other advantages the elimination of water to produce the desired inactivity of the agent. The result of this feature of the process is that the product is ready at all times for use by the mere addition of water without having in the meantime to be kept with any special precautions. Previous foods containing peptonizing agents have required, as far as I am aware, special precautions to keep the excess of peptonizing agent inactive until drunk—such, for example, as preservation at a temperature below 40° Fahrenheit. In other foods it has been common to raise the temperature to a sufficient degree—about 160° Fahrenheit—to destroy the ferment entirely. According to my process neither of these objectionable features is present.

Having described generically the product and process of my invention, I will describe in detail a particular process embodying the invention. It is understood, however, that the process and product as described are capable of very wide variation by those skilled in the art without departure from the invention. For example, the ingredients used and the proportions thereof may be added to or varied, and the temperatures and periods of time may also be altered, and certain of the stages in the concentration of the product may be varied or omitted entirely. For example, the concentrating and desiccating apparatus described in patents of myself and Charles H. Campbell, Nos. 668,159, 668,161, and 668,162, may be employed. In the accompanying drawing I have shown an apparatus of this character.

The milk to be treated, preferably diluted with water in the proportion of five hundred pounds of water to two thousand pounds of milk, may be put into the vessel A and the temperature raised to about 110° Fahrenheit by means of hot water in the jacket B, which water is admitted through a supply-pipe C and drawn off at any desired level through discharge-pipes D D', &c. The peptonizing agent is then added. The peptonizing agent may be, for example, any one of the digestive ferments or any combination thereof applicable to the peptonizing of milk solids. I prefer to use pancreatin for this purpose, which is preferably first prepared by mixing with water and macerating in a proportion of about one pound of commercial dry pancreatin to from two to five hundred pounds of water. This is then put into the milk, and the temperature is maintained at 110° Fahrenheit a sufficient time to effect the desired degree of digestion, which may be about one hour, or until a grayish color appears on the surface and a thin pellicle or slight curdling is noticeable. This completes or nearly completes the peptonizing of the milk to the desired degree. The product is then treated to render inactive the unspent peptonizing agent remaining in the mixture. With the apparatus shown this end may be accomplished by the elimination of the water remaining in the mixture and by the raising of the temperature. For example, I may raise the temperature to between 130° and 140° Fahrenheit and agitate the mass by the injection of air through the pipe E, the air rising through the perforated base F, as indicated by the arrows. By introducing a considerable volume of air I agitate the mass violently, so as to check the activity of the peptonizing agent, continuing this treatment for an hour or more, depending on the degree of acidity of the milk. The continual application of heat and blowing in of air removes the water quite rapidly. After a large proportion of water is removed from the mass the temperature may be lowered, preferably to about 100° Fahrenheit, and maintained thus to the end of the process. The action of the peptonizing agent ceases some time before the complete elimination of the water, and I do not, therefore, have to carry the process to the point of complete desiccation.

When the material has been reduced to about the consistency of ordinary condensed milk, it may be drawn off from the receptacle A into the horizontal cylinder G and the concentration continued by the rotation of such cylinder and the simultaneous blowing in of hot air. When the product is thickened to a substantially semisolid mass, it may be broken up directly in the cylinder G and by continued rotation and exposure to hot air may be reduced to a granular condition suitable for subsequent grinding, if desired. The action of the ferment is considerably slowed by the time the material is so thick as to be transferred from the concentrating-tank into the roller-drum G. The action is practically inhibited when the mass arrives at a crumbly condition. The reason of this is that the peptonizing agent acts only on substances in solution and chiefly on substances in dilute solution and at the surface of a mass. By thus arresting the digestion I may avoid the bitter taste which would otherwise be produced, at the same time, however, retaining a desired quantity of unspent ferment with the advantages above explained.

Various additions to or subtractions from my product may be made, while still retaining the advantages of my invention.

What I claim is—

1. The process which consists in adding a peptonizing agent to fluid milk, permitting such agent to expend a part of its peptonizing powers therein and thus partially peptonize the milk, checking the action of such agent by eliminating water from the mixture before the peptonizing powers of the agent are exhausted without destroying such agent, so that it retains a potential activity and is ready to become energetic to again act upon the milk upon restoration of the mixture to conditions permitting a renewal of such action.

2. The process which consists in adding a peptonizing agent to fluid milk, permitting